United States Patent
Hirao et al.

(10) Patent No.: US 6,442,749 B1
(45) Date of Patent: Aug. 27, 2002

(54) APPARATUS, METHOD AND ARCHITECTURE FOR TASK ORIENTED APPLICATIONS

(75) Inventors: Tsuyoshi Hirao, San Jose; Hirokatsu Araki, Cupertino; Tadashi Takahashi, Sunnyvale; Hitoshi Matsumoto, Los Gatos, all of CA (US); Masaru Wakitani, Inagi (JP)

(73) Assignee: Fujitsu Limited (JP)

( * ) Notice: Subject to any disclaimer, the term of this patent is extended or adjusted under 35 U.S.C. 154(b) by 0 days.

(21) Appl. No.: 09/183,334

(22) Filed: Oct. 30, 1998

(51) Int. Cl.$^7$ ................................................. G06F 9/45
(52) U.S. Cl. .............................. 717/11; 717/5; 717/10; 709/316
(58) Field of Search ........................ 717/1, 11, 5, 10; 709/202, 316

(56) References Cited

U.S. PATENT DOCUMENTS

| | | | |
|---|---|---|---|
| 5,430,836 A | | 7/1995 | Wolf et al. ................. 395/155 |
| 5,457,798 A | * | 10/1995 | Alfredsson .................. 709/301 |
| 5,473,777 A | | 12/1995 | Moeller et al. ............. 395/700 |
| 5,475,845 A | | 12/1995 | Orton et al. ................. 395/700 |
| 5,680,551 A | | 10/1997 | Martino, II ............ 395/200.15 |
| 5,761,656 A | | 6/1998 | Ben-Shachar ................. 704/4 |
| 5,806,079 A | | 9/1998 | Rivette et al. ............. 707/512 |
| 5,809,318 A | | 9/1998 | Rivette et al. ............. 395/773 |
| 5,953,534 A | * | 9/1999 | Romer et al. ................. 717/11 |
| 5,960,202 A | * | 9/1999 | Granston et al. .............. 717/5 |
| 5,966,707 A | * | 10/1999 | Van Huben et al. .......... 707/10 |
| 5,974,258 A | * | 10/1999 | Ferri et al. ..................... 717/11 |
| 5,978,579 A | * | 11/1999 | Buxton et al. ................. 717/1 |
| 6,009,525 A | * | 12/1999 | Horstmann ................. 713/200 |
| 6,044,469 A | * | 3/2000 | Horstmann ................. 713/201 |
| 6,163,794 A | * | 12/2000 | Lange et al. ................ 709/202 |
| 6,179,489 B1 | * | 1/2001 | So et al. ..................... 395/672 |
| 6,237,044 B1 | * | 5/2001 | Jordan ........................ 709/316 |

OTHER PUBLICATIONS

Datamation May 15, 1995 "Legacy Code: Don't Bag It, Wrap it".
Datamation May 15, 1995 "Bring Legacy Code into the Object Realm".
Title: Chimera: hypertext for heterogeneous software environments, Author: Anderson et al, ACM, 1994.*
Title: Constructing application–specific heterogeneous embedded architectures from custom HW/SW applications, Author: Steven Vercauteren et al, ACM, 1996.*
Title: Reconciling environment integration and component independence, Author: Kevin Sullivan et al, ACM, 1990.*

* cited by examiner

*Primary Examiner*—Tuan Q. Dam
*Assistant Examiner*—Chameli C. Das
(74) *Attorney, Agent, or Firm*—Coudert Brothers LLP

(57) ABSTRACT

A software architecture for task oriented applications. The architecture utilizes a wrapper as an intermediate structure between an external calling application and a wrapped component or module. The wrapper is written in a script language and acts as a bridge between the external application and the wrapped component. Data is transferred among components through the intermediary of a table of contents (TOC) file which contains data attribute information and a link to the actual data file.

15 Claims, 4 Drawing Sheets

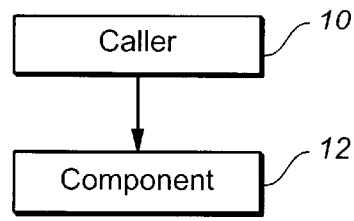
FIG._1A
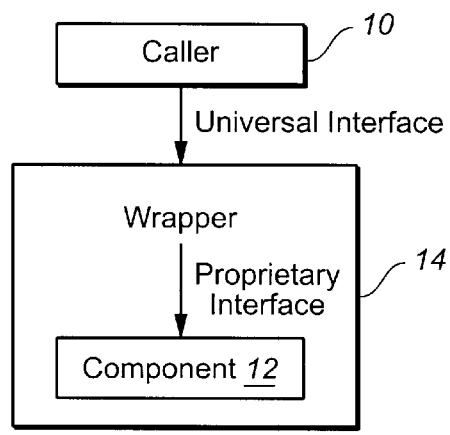
FIG._1B
```
<html>
<Head>
<Object>Component Declaration Here</Object>
<Script language="JavaScript">
```
| Script Program Shown Here |
| --- |
```
</Script>
</Head>
<Body>
</Body>
</html>
```
FIG._2

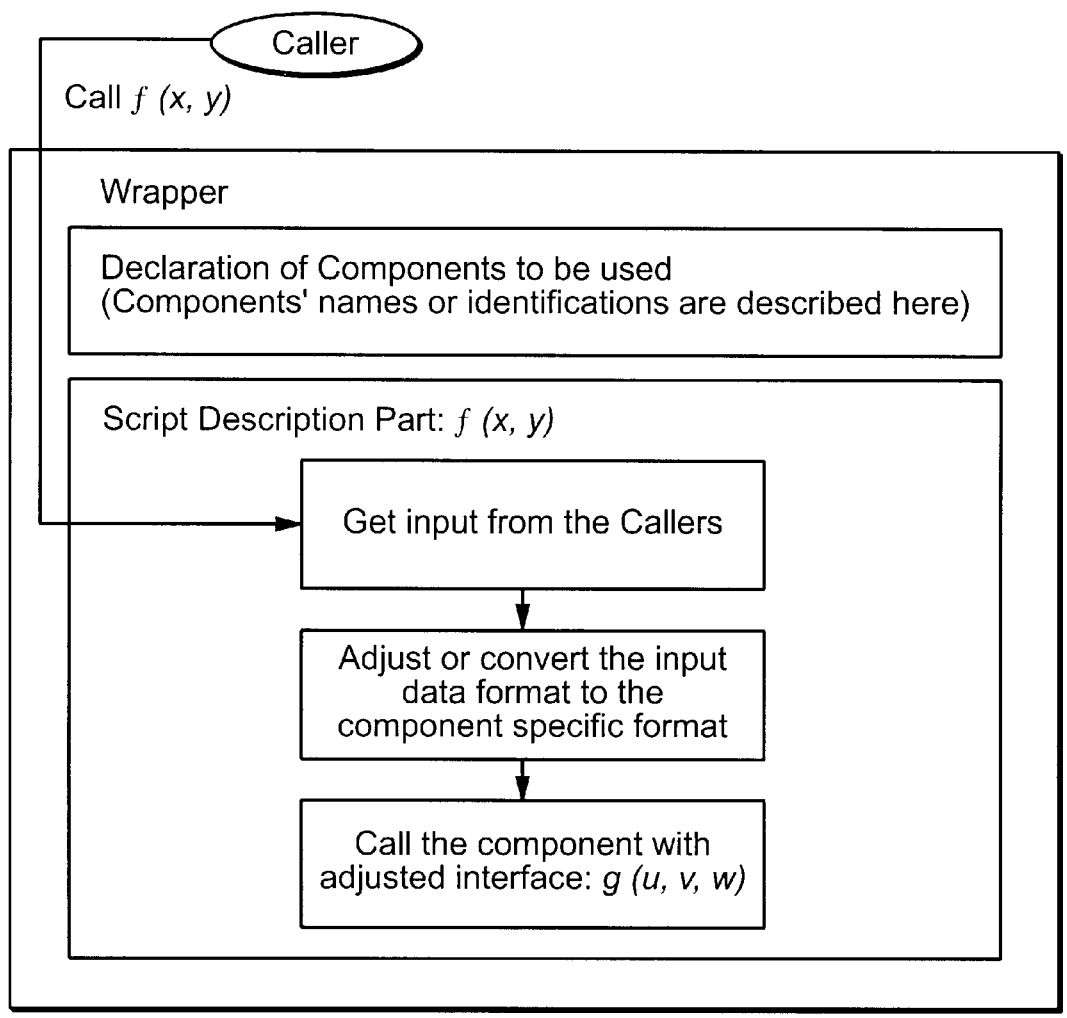
FIG._3

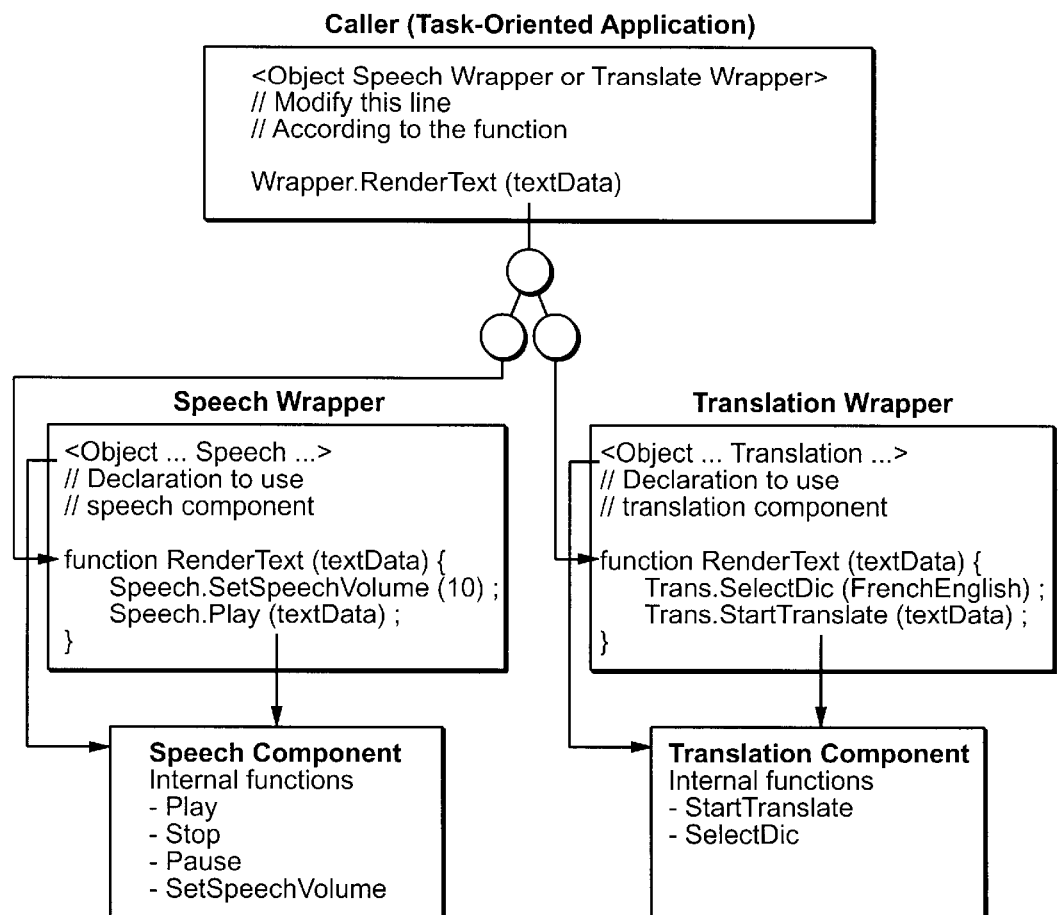
FIG._4
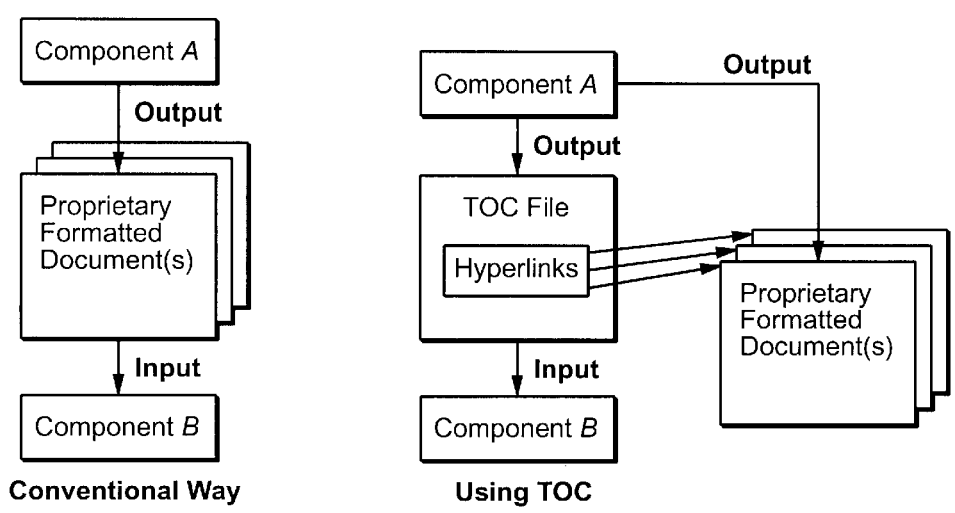
FIG._5A Conventional Way
FIG._5B Using TOC

```
<html>
<head>
<title>TOC Sample</title>
</head>

<style>
.infotype
.isRead
.subject
.sender
.date
</style>

<body>

<table>
<thead>
<tr>
        <th class=infotype><span>Information</span></th>
        <th class=isRead  ><span>Read/Unread</span></th>
        <th class=subject ><span>Title       </span></th>
        <th class=sender  ><span>News source</span></th>
        <th class=date    ><span>Date        </span></th>
</tr>
</thead>
<tbody>
<tr id="R00000">
        <td class=infotype><span id="I00000">News</span></td>
        <td class=isRead  ><img  id="C00000" src ="..¥_system¥unread.ico"></img></td>
        <td class=subject ><a    id="A00000" href="C:¥Work¥url_0.htm">Title of the First Messa
ge</a></td>
        <td class=sender  ><span id="S00000">Business Wire</span></td>
        <td class=date    ><span id="D00000">08/24/1998</span></td>
</tr>
<tr id="R00001">
        <td class=infotype><span id="I00001">News</span></td>
        <td class=isRead  ><img  id="C00001" src ="..¥_system¥unread.ico"></img></td>
        <td class=subject ><a    id="A00001" href="C:¥Work¥url_1.htm">Title of the Second Mess
age</a></td>
        <td class=sender  ><span id="S00001">Business Wire</span></td>
        <td class=date    ><span id="D00001">08/24/1998</span></td>
</tr>
<tr id="R00002">
        <td class=infotype><span id="I00002">News</span></td>
        <td class=isRead  ><img  id="C00002" src ="..¥_system¥unread.ico"></img></td>
        <td class=subject ><a    id="A00002" href="C:¥Work¥url_2.htm">Title of the Third Messa
ge</a></td>
        <td class=sender  ><span id="S00002">Business Wire</span></td>
        <td class=date    ><span id="D00002">08/24/1998</span></td>
</tr>
</tbody>
</table>
</body>
</html>
```

FIG._6

APPARATUS, METHOD AND ARCHITECTURE FOR TASK ORIENTED APPLICATIONS

BACKGROUND OF THE INVENTION

1. Field of the Invention

The present invention relates to computer software architectures, and more specifically, to a software architecture for applications composed of a plurality of software components which perform specific tasks. The inventive architecture facilitates execution of the software components in different sequences and the efficient transfer of data or documents between components. The invention also relates to computer hardware and a method for implementing a task oriented application in accordance with the inventive architecture.

2. Description of the Prior Art

The field of computer software engineering includes the development of design principles intended to guide the structured design and implementation of software applications. One such principle is that of a task oriented architecture for an application. In such an architecture, the functions performed by the application (e.g., data processing functions such as spell checking, transmission of data to a specified location, data conversion, etc.) are represented as separate tasks with each task performed by a dedicated component or module of the application program. The components or modules are typically invoked in a specified sequence without the need for inputs from a user. The invoked components perform a sequence of tasks which execute an overall function desired by the user.

In order to achieve greater efficiency in terms of increasing the uniformity with which applications execute a sequence of tasks, and in reducing the size of software programs, it is desirable that a component or module be capable of being shared between multiple applications. This permits a set of generic task performing components to be combined in a specific sequence to perform a desired set of functions. A component or module based software architecture facilitates this because each component can be designed to be substantially self-contained.

However, a problem encountered when attempting to utilize a component for a specific task in different sequences with other components or as part of multiple applications is that the task component interface may not be fully compatible with that of the calling component(s) in the application, or with that of the application component(s) called by the task component. This problem also limits the ability to rearrange components designed to implement various tasks into new applications.

While it is possible to design every software component of every application to have a common interface, this is an enormous task. This approach also does not address the issue of how to access existing software components (sometimes referred to as "legacy" software) which may have been written with incompatible interfaces.

One approach which permits software components with different interfaces to operate together is termed a "wrapper". A wrapper is a software structure which is positioned above or outside of (in a hierarchical sense) a specific application or component. The wrapper functions as an intermediary between the "wrapped" application or component and an external application or component. The wrapper accepts an input instruction from the external (calling) application or component and, by having a common interface with the wrapped application or component, is able to cause that wrapped application or component to be executed to perform a desired task. This is typically accomplished by converting the character stream from the wrapped software into a procedural or object oriented application programming interface (API). The external software applications or components interact with the wrapped software through the API. The wrapper thus removes the necessity for a compatible interface between the calling and called applications or components. A wrapper may thus be viewed as performing a translation function between a universal interface and the proprietary interface of the wrapped component.

However, although use of a wrapper provides a solution to the problem of incompatible software application and/or component interfaces, conventional wrappers do have limitations. The primary disadvantage of conventional wrappers is that they are specifically tailored to the wrapped software. This means that the code in the wrapper is written in the same language as the wrapped component, or in the form of a procedural interface to C or COBOL or an object oriented interface to C++ or Smalltalk. As a result, a new wrapper must be written for each new wrapped application or component. In addition, a wrapper written in such languages cannot be modified by a user to accommodate changes in the wrapped component. This places a significant limitation on a user's ability to customize and extend the wrapper, and as a result, the flexibility of the software architecture itself Another disadvantage of conventional task oriented architectures relates to the way in which data or documents are transferred between different components of an application, or between components in different applications. In conventional architectures, the actual data or document is transferred in a proprietary format between components. This limits the type of data or documents exchanged (since the types exchanged must conform to the proprietary format, which may not recognize data types which are not hard coded into the format), and does not permit a component to modify the attributes of the data which are exchanged. This can limit the ability of the components to perform tasks which may require different data attributes to operate than those defined by the format.

What is desired is a computer software architecture for task oriented applications which can be customized by a user to permit access to components or applications having different interfaces. Computer hardware and a method for implementing such a software architecture is also desired.

SUMMARY OF THE INVENTION

The present invention is directed to a software architecture for task oriented applications. The architecture utilizes a wrapper as an intermediate structure between an external calling application and a wrapped component or module. The wrapper is written in a script language and acts to provide a bridging interface between the external application and the wrapped component. Data is transferred among components through the intermediary of a table of contents (TOC) file which contains data attribute information and hyperlinks to the actual data. The invention is also directed to computer hardware and methods for implementing the inventive software architecture.

BRIEF DESCRIPTION OF THE DRAWINGS

FIGS. 1(A) and (B) are block diagrams showing how the wrapper of the present invention may be used to provide a bridge between a calling program and a wrapped component.

FIG. 2 shows the format of a HTML document into which a wrapper written in script may be incorporated to implement the present invention.

FIG. 3 is a flow chart showing the primary steps involved when an external calling program causes a wrapped component to be executed through the intermediary of a wrapper of the architecture of the present invention.

FIG. 4 is a block diagram showing an exemplary architecture and pseudo code for a wrapper and related task implementing components constructed in accordance with the architecture of the present invention.

FIGS. 5(A) and (B) are block diagrams showing how data is passed between two components in a conventional architecture and using a table of contents format in accordance with the architecture of the present invention.

FIG. 6 is a listing showing an example of a table of contents file written in HTML which is suitable for use with the architecture of the present invention.

DETAILED DESCRIPTION OF THE INVENTION

The present invention is directed to a software architecture which facilitates the use of software components or modules as part of multiple applications. Each component may perform a specified task or function, with the sequence and type of components executed determining the overall application function that is performed. The separate components are encapsulated in a software structure called a wrapper which provides a bridge between the interface of an external software component and that of the encapsulated component. The wrapper permits a variety of external software applications to execute the encapsulated component. Data or documents are transferred between two software components by transfer of a file which contains hyperlinks to the data or documents, instead of transferring the actual data or documents in a proprietary format, as in conventional architectures. The combination of the inventive wrapper and file transfer mechanism provides a flexible architecture for implementing software applications in a structured and efficient manner.

FIGS. 1(A) and (B) are block diagrams showing how the wrapper of the present invention may be used to provide a bridge between a calling program and a wrapped component. As shown in FIG. 1(A), in a conventional architecture, a calling program or routine (labeled "Caller" in the figure) 10 calls a software component 12 to cause a specific task to be implemented. Caller 10 and component 12 have a common interface which is typically of a proprietary nature. Because of this proprietary nature, the range of calling applications which can cause software component 12 to execute its task or function is limited.

FIG. 1(B) shows how a wrapper 14 may be used to provide a bridge between a calling program or routine 10 and software component 12. Wrapper 14 is capable of accessing component 12 using that component's proprietary interface, and is capable of interfacing to caller 10 through a common interface with caller 10 (labeled "Universal Interface" in the figure). In operation, the calling program calls the wrapper, which then acts to call the encapsulated component.

In order to make software components exchangeable (i.e., capable of being called by) between different applications, the data exchanged between the components requires a common format. This standard format is an element of the Universal Interface. Regardless of the type of data processed by the individual components, a wrapper can be used to encapsulate the proprietary data format and provide such a Universal Interface for the inventive task-oriented application architecture.

Wrapper 14 thus provides a higher level software structure which encapsulates the proprietary interface and permits a wider range of calling programs to execute component 12. However, in contrast to conventional wrappers, the wrapper of the present invention can be customized and extended as required by a user. This permits the wrapper to be modified as needed by an end user to reflect changes in the component(s) to be called, or changes in the desired order of calling the components.

These features of the present invention are achieved by writing the wrapper in the form of a script program instead of a compiled language, as for a conventional wrapper. FIG. 2 shows the format of a HTML document into which a wrapper written in script may be incorporated to implement the present invention.

In an HTML document, the script language describes how the control structure defined by the document reacts upon the occurrence of a user generated event (e.g., pressing a button, selecting data, or moving to or from another page). For example, given a button with the text "OK" on it and named as the "OK Button", if it is desired to perform some action when a user selects the button, a function can be written to describe the procedure to handle the event (e.g., send data to a server or show a specified message to the user).

As indicated by FIG. 2, the script is put in the HTML document as follows:

<body>
Any HTML
<script>
Insert Script Here
</script>
Any HTML
</body>

Note that the script language can be used to load and execute external components which perform functions that are not usually performed by HTML itself.

A wrapper can be produced in a similar manner to creating a HTML document for an internet Web page. However unlike a conventional Web document, a wrapper would typically not contain script for a user interface or graphics. The inventive wrapper structure typically contains a script program which functions as a subroutine. Thus, a text editor can be used to create the inventive wrapper. This assists in rapid prototyping of the wrapper because it can he edited and executed quickly.

The code shown in FIG. 2 is a skeletal version of a typical HTML document. Note that two features needed for the inventive wrapper are:

(1) Declare the component to be called in <Object> tag
(The script loads it and calls the function in it); and
(2) Put the functions after the <Script> tag
(The functions intermediate between the calling application and the components; and are placed in the section labeled "Script Program Shown Here").

The function part of the wrapper is written to comply with the script language specification. For example, in JavaScript, the function may be specified in the following format:

function public_AnyName ( )
{
// Any Procedures Here.
}

The public_prefix is necessary for other programs to access the script from outside the wrapper.

An advantage of writing the wrapper in a script language is that it can be modified by an end user. This is not possible with wrappers written in compiler based languages (e.g., C++) which do not make the source code available to an end user. This prevents a conventional wrapper from being used by multiple developers, and frustrates an end user's desire to alter the component called by a wrapper to accommodate component interface or content changes.

As noted, the inventive wrapper may be easily modified by an end user to make an application extendible and customizable. For example, a modification to the wrapper contents may be desirable in the following situations:

(1) When the interface of the components called by the wrapper has changed. In this situation, the inventive wrapper may be modified to adjust to the new interface; and (2) When it is desired to change the component which is called. Generally a wrapper's script includes the name or another form of identification for the component. In a non-editable wrapper, only the developer can change the called component. The inventive, editable wrapper permits the end user to change the wrapper contents so that the component to be called can be changed.

As an example, suppose the called component is a spell checker. At a later time, an improved spell checker is developed which includes a different interface because it requires a different dictionary. In this situation, the wrapper can be modified to be compatible with the new component. Subsequently, the application is requested to implement the spell checker for another language. This time the wrapper requires only a minor modification because just the spell checker component name would be modified from "Component 1" to "Component 2."

FIG. 3 is a flow chart showing the primary steps involved when an external calling program causes a wrapped component to be executed through the intermediary of a wrapper of the architecture of the present invention. As shown in the figure, a calling application ("Caller") invokes the function f (x, y), which is specified in the wrapper script, in the same manner in which it would call an ordinary function. The Caller passes any arguments (i.e., parameters such as x, y) in the conventional way used in function calls. To call a target function, g (u, v, w) contained in a component, a procedure to convert the input parameters (x, y) from the Caller to a component specific format is required, as shown in the middle of the block. This section of the script would be modified as required to conform the logic to the specification of g (u, v, w).

For example, if the function f (x, y) accepts a spread sheet file name as an argument x (for example), but the function g accepts only a database file name as an argument u, then the wrapper converts the data as required in the "Adjust or convert the input, . . . " stage. If the data format or specification of the database has changed, this section of the wrapper would be modified and the component call at the bottom of the figure would be replaced by a new function, e.g., h (s, t).

FIG. 4 is a block diagram showing an exemplary architecture and pseudo code for a wrapper and related task implementing components constructed in accordance with the architecture of the present invention. In the figure, assume Caller represents a task-oriented application, from which the function RenderText is called. The wrapper that encapsulates a component which includes this function is associated with the Caller by declaring the wrapper name in the first line of the calling code. Depending upon the task to be completed, the Caller may call the Speech Wrapper or Translation Wrapper, for example. In the examples shown, if the Speech Wrapper is associated with the desired function, the function causes a text string to be read using a computer generated voice. In this case, the Speech Component called from the Speech Wrapper performs the task. A significant advantage of the inventive wrapper mechanism is that it permits changing a feature of the application simply by changing the wrapper script. If instead of executing the Speech Component, it is desired to translate a section of text, all that is required is to modify a few lines of the wrapper script and the first line in the application (in this example). In this case, the Translation Wrapper would be called to execute the Translation Component using the selected text. Since the wrappers are written in script it is not necessary to produce new source code and then compile and debug it. Furthermore, wrappers written in a compiled language often depend upon particular components because they require that the names or identification of the components be hard-coded into the source code. This limits the flexibility of the wrappers with regards to being altered to accommodate new components or new uses of existing components.

A second important aspect of the inventive architecture is the use of a specific data format to facilitate data or document transfers between software components. This data format simplifies the handling of different types and formats of documents, and permits a software component to identify and transfer those data or document attributes of interest to that component.

FIGS. 5(A) and (B) are block diagrams showing how data is passed between two components in a conventional architecture (5(A)) and using a table of contents format (5(B)) in accordance with the architecture of the present invention. As shown in FIG. 5(A), in a conventional architecture, a component A transfers data or documents in a proprietary format as an input to component B. This limits possible transfers to data which is formatted in the previously recognized proprietary format(s).

In the present invention (as shown in FIG. 5(B)), the HTML file format (or another suitable markup language) is used to produce a Table of Contents (TOC) file. The inventive TOC file contains data records similar to a database file. An important field of such TOC records is a hyperlink to a document. The linked document is handled by the software components of the architecture as an input file. In the inventive architecture, a component doesn't receive the document directly. Instead, the TOC file is passed and the component accesses the document(s) through the links in the file A component may create a data file, but it does not send the file directly to other components. Instead, it creates or updates a TOC file and places a link to the document in the updated TOC file.

Along with the hyperlink(s), each record may contain the following attribute data as defaults:

(1) Infotype: the type of information that may be used in browsing tools, etc.;

(2) IsRead: used in list browsing tools like a Message Board to indicate whether or not a record has been opened;

(3) Subject: tells the subject or title of the contents linked to the record;

(4) Sender: indicates the address of the message source; and (5) Date: the date the message was retrieved.

The use of the HTML or another similar markup language format provides several significant advantages. The format is open and standardized. This means that it can easily be parsed using standard methods. It can also be utilized in any platform which supports the Internet.

The TOC's use of an indirect reference for the data (through the medium of a hyperlink or other form of link) permits the architecture to accommodate any type of document. Additional characteristics (attributes) of a document can be passed from one component to another by using HTML or another markup language. A component can even add attributes to the TOC. For example, a component may add an attribute such as "Summary". In addition, a component can ignore an attribute which is unnecessary for its execution. For example, a component may not depend upon the value of the attribute IsRead at the time of its execution. However, note that all of the attributes contained in a TOC input to a component must be retained in the TOC output by that component.

As noted, the TOC files can be written in Markup Languages like HTML or XML (where HTML is the language widely used for describing Web pages on the Internet and XML is a language used for describing data structures). A TOC file includes hyperlinks from which document files are accessed. The hyperlinks may contain the file name of the document which is stored in memory on a hard drive (for example), or the address of a document on the Internet.

As noted, the TOC also includes information for each linked document, e.g., the date the linked document was created, the title of the linked document, or a summary of the linked document. An example (written in XML) TOC file is:

<DateSent>00/00/0000</DateSent>
<Title> Patent Application</Title>
<Summary>This document is a patent application for . . . </Summary>

As noted, other data may be added to the TOC. For example, if the called software component needs to have data concerning "when the document is read", a tag can be added to the TOC file that represents this information:

<DateRead>00/00/0000</DateRead>

The general structure of a TOC file is shown below:

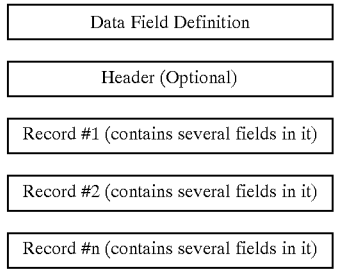

FIG. 6 is a listing showing an example of a TOC file written in HTML which is suitable for use with the architecture of the present invention. The Style section of the TOC file defines the data fields in the file. The example TOC file shown in FIG. 6 has five fields in the data records (e.g., infotype. IsRead, etc.). The Table section of the TOC file contains the header for the table (thead) and three data records. Each data record includes data corresponding to each of the fields defined in the Style section. Although the example TOC file uses a Table tag to describe the data structure, other tags may also be used.

An inventive architecture and file transfer format for task oriented applications has been described. The architecture includes a plurality of software components, with each component being capable of executing a desired task or function. Each component is encapsulated by a wrapper structure which provides an intermediary between a calling application and the component. The wrapper is written in a script language and is easily modifiable by a text editor to accommodate new components or changes in an existing component. Data or documents are transferred between components by transfer of a file containing links to the data file or document, instead of by transferring the actual data or document in a proprietary format. The inventive architecture and file transfer mechanism permits an end user to customize and extend the sequencing and type of software components executed.

The inventive architecture may be implemented in the form of software executed by a controller or central processing unit (CPU) of a computer, with the software being stored in a memory associated with the CPU (e.g., ROM) or in another type of storage media which is accessed by the CPU. The inventive architecture can also be provided as a program which can be downloaded over a connection to the computing device (e.g., the Internet) and then executed by the device.

The terms and expressions which have been employed herein are used as terms of description and not of limitation, and there is no intention in the use of such terms and expressions of excluding equivalents of the features shown and described, or portions thereof, it being recognized that various modifications are possible within the scope of the invention claimed.

What is claimed is:

1. A software architecture, comprising:
   a plurality of software components capable of performing a plurality of desired functions;
   a wrapper component written in a script language and modifiable by an end user, and associated with each software component, the wrapper component configured to be called by an external application and configured to call the software component, wherein the external application and software component do not have a compatible interface; and
   a file transfer structure for transferring data or a document between a first and second of the plurality of software components and which can be read by or output by the software components, the file structure containing a link to the data or document to be transferred, wherein the data or document is contained in a file separate from the file transfer structure.

2. The architecture of claim 1, further comprising:
   an application external to the plurality of software components which calls the software components in a desired sequence.

3. The architecture of claim 1, further comprising:
   a text editor for modifying the wrapper component.

4. The architecture of claim 1, wherein the file transfer structure further comprises:
   attribute data associated with attributes of the data or document transferred between the software components.

5. The architecture of claim 1, wherein the script language is HTML.

6. A method of performing a task which can be decomposed into a plurality of sub-tasks, comprising:
   providing a software component configured to perform each of the plurality of sub-tasks;
   providing a wrapper component written in a script language and modifiable by an end user, and associated with each software component, the wrapper component configured to be called by an external application and configured to call the software component, wherein the external application and software component do not have a compatible interface;

providing a file transfer structure to transfer data or a document from a first software component to a second software component, the file transfer structure including a link to the data or document but not the data or document itself, determining a sequencing of the sub-tasks for performing the task; and for each sub-task in the sequence, calling the wrapper component associated with the software component configured to perform the sub-task; and executing the software component configured to perform the sub-task in response to the calling of the associated wrapper component, wherein the file transfer structure is used by a second software component to access data or a document output by a first software component.

7. The method of claim 6, wherein the step of providing the wrapper component further comprises:

creating the wrapper component using a text editor.

8. The method of claim 6, wherein the step of providing the wrapper component further comprises:

providing the wrapper written in HTML.

9. A method of operating a software application to perform a desired task composed of a plurality of subtasks, comprising:

providing a software component for performing each of the sub-tasks;

providing a control structure as part of the application which sequences the software components to perform the desired task, wherein the control structure is not capable of directly interfacing with one or more of the software components;

providing a wrapper structure associated with each of the software components which the control structure is not capable of directly interfacing with, the wrapper structure being written in a script language and modifiable by an end user;

causing the control structure to call each of the software components in the sequence, wherein for the software components not directly capable of interfacing with the control structure the control structure calls the wrapper structure associated with the software component and the wrapper then calls the software component; and when part of performing the task, transferring data or a document between a first and a second software component by transferring a file structure containing a link to the data or document, but not the data or document itself.

10. The method of claim 9, wherein the step of transferring data or a document between a first and a second software component further comprises:

transferring a file structure containing data associated with attributes of the data or document.

11. The method of claim 9, wherein the step of providing the wrapper structure further comprises providing the wrapper structure written in HTML.

12. An apparatus for implementing a software architecture for a task oriented application, comprising:

a storage medium on which is encoded instructions to implement a first desired function;

a second desired function;

a wrapper component written in a script language, configured to be called by an external application and configured to call the instructions which implement the first desired function, wherein the external application and the instructions for the first desired function do not have a compatible interface; and a file transfer structure for transferring data or a document between the first and second functions and containing a link to the data or document to be transferred, wherein the data or document is stored on a computer readable medium in a file separate from the file transfer structure; and a processing unit capable of executing instructions encoded on the storage medium which can be read by the processing unit.

13. The apparatus of claim 12, further comprising:

instructions encoded on the storage medium which implement a text editor capable of forming the instructions to implement the wrapper component; and an input device for a user to access the text editor.

14. An article of manufacture, comprising:

a computer readable storage medium;

a set of instructions encoded on the storage medium which can be executed by a computing device, the set of instructions further comprising instructions to control the operation of the computing device to implement a wrapper for a software component, the wrapper written in a script language and configured to be called by an external application and configured to call the software component, wherein the external application and the software component do not have a compatible interface; and instructions to control the operation of the computing device to implement a file transfer structure for transferring data or a document between the software component and a second software component, the file transfer structure containing a link to the data or document to be transferred, wherein the data or document is stored on a computer readable medium in a file separate from the file transfer structure.

15. The article of manufacture of claim 14, further comprising:

instructions encoded on the storage medium which implement a text editor capable of forming the instructions to implement the wrapper.

* * * * *